United States Patent
Kabeya et al.

(10) Patent No.: US 9,321,897 B2
(45) Date of Patent: Apr. 26, 2016

(54) THERMOPLASTIC RESIN COMPOSITION AND TOILET COMPONENTS MADE THEREFROM

(71) Applicant: Japan Polypropylene Corporation, Chiyoda-ku (JP)

(72) Inventors: Masayuki Kabeya, Mie (JP); Toshihiro Yoshida, Mie (JP); Itsushi Imamura, Mie (JP)

(73) Assignee: Japan Polypropylene Corporation, Chiyoda-ku (JP)

(*) Notice: Subject to any disclaimer, the term of this patent is extended or adjusted under 35 U.S.C. 154(b) by 0 days.

(21) Appl. No.: 14/349,572

(22) PCT Filed: Oct. 25, 2012

(86) PCT No.: PCT/JP2012/077561
§ 371 (c)(1),
(2) Date: Apr. 3, 2014

(87) PCT Pub. No.: WO2013/062035
PCT Pub. Date: May 2, 2013

(65) Prior Publication Data
US 2014/0309350 A1 Oct. 16, 2014

(30) Foreign Application Priority Data
Oct. 26, 2011 (JP) .................... 2011-234759

(51) Int. Cl.
| | |
|---|---|
| *C08K 5/03* | (2006.01) |
| *C08K 5/41* | (2006.01) |
| *C08K 3/00* | (2006.01) |
| *C08K 5/04* | (2006.01) |
| *C08K 5/103* | (2006.01) |
| *C08K 5/521* | (2006.01) |
| *B29L 31/00* | (2006.01) |
| *B29C 45/00* | (2006.01) |
| *E03D 11/02* | (2006.01) |
| *A47K 13/02* | (2006.01) |

(52) U.S. Cl.
CPC ............... *C08K 5/03* (2013.01); *C08K 3/0058* (2013.01); *C08K 5/04* (2013.01); *C08K 5/103* (2013.01); *C08K 5/41* (2013.01); *C08K 5/521* (2013.01); *A47K 13/02* (2013.01); *B29C 45/0001* (2013.01); *B29L 2031/7694* (2013.01); *E03D 11/02* (2013.01)

(58) Field of Classification Search
CPC ............ C08K 5/03; C08K 5/41; C08K 5/521; C08K 5/103
See application file for complete search history.

(56) References Cited

U.S. PATENT DOCUMENTS

| 5,712,336 A | 1/1998 | Gareiss et al. | |
|---|---|---|---|
| 6,344,508 B1 * | 2/2002 | Endo | C08K 5/103 524/313 |

FOREIGN PATENT DOCUMENTS

| CN | 1293697 A | 5/2001 |
|---|---|---|
| CN | 1495232 A | 5/2004 |
| CN | 101759930 A | 6/2010 |
| CN | 102585451 A * | 7/2012 |
| JP | 08 283546 | 10/1996 |
| JP | 10 287778 | 10/1998 |
| JP | 11 080455 | 3/1999 |
| JP | 11 181182 | 7/1999 |
| JP | 2000 1580 | 1/2000 |
| JP | 2000 265070 | 9/2000 |
| JP | 2000 265071 | 9/2000 |
| JP | 2002 226644 | 8/2002 |
| JP | 2003 105144 | 4/2003 |
| JP | 2008 74896 | 4/2008 |
| JP | 2009 275117 | 11/2009 |
| JP | 2009 275118 | 11/2009 |
| JP | 2011 144278 | 7/2011 |
| WO | 2009 72299 | 6/2009 |

OTHER PUBLICATIONS

International Search Report Issued Nov. 20, 2012 in PCT/JP12/077561 Filed Oct. 25, 2012.
Combined Office Action and Search Report issued Jul. 3, 2015 in Chinese Patent Application No. 201280052346.5 (with English language translation and English translation of categories of cited documents).

* cited by examiner

*Primary Examiner* — Robert Harlan
(74) *Attorney, Agent, or Firm* — Oblon, McClelland, Maier & Neustadt, L.L.P.

(57) ABSTRACT

Provided is a thermoplastic resin composition that is free of discoloration defects, is resistant to the staining and deterioration caused by urine, fecal matter, detergents and so forth, exhibits an excellent tactile sensation, and also exhibits an excellent marring resistance and that is thus well suited for toilet components. Toilet components comprising this thermoplastic resin composition are also provided.

The thermoplastic resin composition comprises (A) a thermoplastic resin and, per 100 weight parts thereof, (B) 2 to 40 weight parts of an organic flame retardant, 0.1 to 2 weight parts of a component (D), and as desired, (C) 0.1 to 20 weight parts of a flame retardant synergist, wherein the component (D) satisfies the following condition:

condition: the component (D) is at least one compound selected from the group consisting of polyolefin-based waxes, alcohols, carboxylic acids, and esters, and having a melting point of not more than 100° C. and an HLB value of not more than 5.

The toilet components and so forth comprise this thermoplastic resin composition.

13 Claims, No Drawings

THERMOPLASTIC RESIN COMPOSITION AND TOILET COMPONENTS MADE THEREFROM

TECHNICAL FIELD

The present invention relates to a thermoplastic resin composition and to toilet components comprising this thermoplastic resin composition. More particularly, the present invention relates to a thermoplastic resin composition, for example, a polypropylene-based resin composition, which when used for toilet components, exhibits an inhibition of the discoloration caused by urine, fecal matter, detergents, and so forth, or occurring at locations in contact with the body, exhibits an excellent tactile sensation, and exhibits an excellent marring resistance, and additionally relates to toilet components comprising this thermoplastic resin composition.

In this Description, "toilet components" refers to components that are generally used in the toilet environment, e.g., the toilet seat, toilet lid, washing nozzle that washes a region by ejecting warm water, the main casing for a warm water washing device, the water tank, and so forth.

BACKGROUND ART

In the past an acrylonitrile-butadiene-styrene resin (abbreviated below as ABS resin) was generally used as the resin used for toilet components. This ABS resin had excellent properties, e.g., a high stiffness, high impact resistance, and high gloss, but also had the problem of an inferior chemical resistance, e.g., acid resistance and alkali resistance, and in particular had an inferior acid resistance.

Detergents having an improved cleaning performance have been developed and used in recent years in order to remove the causes of staining in the toilet environment, for example, microorganisms due to the adhesion of urine or fecal matter, stains due to mold growth, the urea, phosphate salts, and crude proteins in urine stain components, discharges from patients during periods of drug intake, excretion of excess vitamins due to excessive consumption of soft drinks, and the organics in urine and fecal matter, and also water stains, blood, toilet cleansers, flush toilet cleansers, and so forth. However, this has produced the problem of discoloration and a deterioration in mechanical properties—as well as cracking in extreme cases—with toilet components made of ABS resin and particularly with the cleaned-daily toilet lid and toilet seat.

On the other hand, the use of polypropylene-based resins, which have an excellent chemical resistance among thermoplastic resins, is also known as an avenue for addressing such problems.

However, general polypropylene-based resins were not completely satisfactory with regard to properties such as the stiffness and gloss as for ABS resins, tactile sensation, marring resistance, and a discoloration resistance that would resist the discoloration caused by urine, fecal matter, and detergents, and improvements in these areas were strongly desired.

Various means have been proposed as attempts to solve these problems with polypropylene-based resins (refer, for example, to Patent Documents 1 to 5).

For example, Patent Document 1 discloses that the incorporation of 0.01 to 1 weight part of a hindered amine stabilizer and 0.01 to 1 weight part of an aromatic phosphorus-type antioxidant in 100 weight parts of a polypropylene resin provides a polypropylene resin composition that is resistant to the discoloration caused by urine, fecal matter, and detergents and that exhibits an excellent tactile sensation, an excellent resistance to thermal ageing, and an excellent resistance to detergents.

Patent Document 2 discloses that the incorporation of 0.01 to 1 weight part of a hydroxylamine-type compound and 0.05 to 1 weight part of a hindered amine photostabilizer in 100 weight parts of a polypropylene-based resin provides a polypropylene resin composition that yields moldings free of urine-induced discoloration and that exhibits little scorching during processing.

Patent Document 3 discloses a stain-resistant polypropylene resin composition that exhibits an excellent resistance to staining and that comprises a polypropylene resin, a polar group-containing silicone oil, and a compatibilizer that improves the compatibility between the polypropylene resin and the polar group-containing silicone oil, wherein the polar group-containing silicone oil is dispersed in the polypropylene resin.

Patent Document 4 discloses a resin composition that is resistant to urine-induced discoloration and that is well suited for materials such as toilet seats and toilet lids and has an excellent resistance to urine-induced discoloration, an excellent heat resistance, and an excellent ageing resistance. This resin composition is a polypropylene-based resin and, per 100 weight parts thereof, 0.2 to 10 weight parts of a white pigment, e.g., titanium oxide, zinc oxide, and so forth, 0.02 to 2 weight parts of a hindered amine compound having a molecular weight of at least 1,500, and not more than 0.02 weight parts of a phenolic antioxidant.

Patent Document 5 discloses a polypropylene-based resin composition for toilet seat components that exhibits a satisfactory inhibition of warpage by toilet seat components, a satisfactory inhibition of the discoloration induced by urine, fecal matter, and detergents, an excellent tactile sensation, excellent warping characteristics, an excellent stiffness, and also an excellent resistance to thermal ageing and an excellent resistance to detergents. This resin composition is obtained by incorporating 0.01 to 1 weight part of a nucleating agent in 100 weight parts of a highly crystalline polypropylene-based resin that has an isotactic pentad fraction of at least 96%, and the resin composition has a prescribed melt flow rate (MFR) and a prescribed memory effect (ME) and has a crystallization temperature of 125 to 136° C.

Heated toilet seats have, however, become predominant, and this also has been accompanied by a requirement for flame retardancy in the polypropylene-based resin compositions that are used for toilet components (toilet seat components). A brominated flame retardant and antimony trioxide as a flame retardant synergist have heretofore been incorporated in combination in order to impart flame retardancy to polypropylene-based resins, and such flame-retardant polypropylene-based resins are widely used as general-purpose flame-retardant resins in diverse molded articles where flame retardancy is required.

However, in addition to molding defects, such as the appearance of silver streaks, caused by decomposition gases from the flame retardant, the problem has arisen of the generation of appearance defects in the surface of molded articles due to scorching. Various means have been proposed as attempts to solve these problems with flame-retardant polypropylene-based resins (refer, for example, to Patent Documents 6 to 9).

For example, Patent Document 6 discloses a flame-retardant polypropylene-based resin molding adapted for toilet seat components, that exhibits an excellent moldability and that is free of the appearance of molding defects such as silver streaks even when fast-fill molding is performed. This is achieved by a resin molding that is molded from a flame retardant-containing polypropylene-based resin composition, wherein this resin composition has a prescribed melt flow rate (MFR), a prescribed memory effect (ME), and a prescribed density.

In addition, Patent Document 7 discloses a polypropylene-based resin composition that is adapted for applications such as toilet seats and toilet lids and that yields molded articles that have an excellent surface appearance wherein the generation of, e.g., silver streaks and scorching, is inhibited. This polypropylene-based resin composition contains (A) a prescribed high-crystallinity propylene-based polymer I and, per 100 weight parts thereof, 1 to 25 weight parts of (B) a propylene-based polymer II that has an MFR of 1 to 20 g/10 minutes, a Q value of at least 7, and a ratio (Mz/Mw) of the Z-average molecular weight (Mz) to the weight-average molecular weight (Mw) of at least 5; 3 to 50 weight parts of (C) an organic flame retardant; 1 to 40 weight parts of (D) an antimony compound; and 0.01 to 0.5 weight parts of (E) a silicone oil.

Patent Document 8 discloses a crystalline polypropylene resin composition that is well suited for applications such as toilet seats and toilet lids and that yields molded articles that have an excellent surface appearance wherein the generation of, e.g., silver streaks and scorching, is inhibited. This composition contains (A) a prescribed crystalline polypropylene and, per 100 weight parts thereof, 1 to 25 weight parts of (B) a propylene-based polymer that has an MFR of 0.01 to 100 g/10 minutes, a Q value of 3.5 to 10.5, a content of the component with a molecular weight (M) of at least 2,000,000 of at least 0.4 weight % but less than 10 weight %, not more than 3.0 weight % component that elutes at a temperature less than or equal to 40° C. in temperature-rising elution fractionation (TREF), an isotactic triad fraction (mm) of at least 95%, and a strain hardening ($\lambda$max) in measurement of the extensional viscosity of at least 6.0; 3 to 50 weight parts of (C) an organic flame retardant; and 1 to 40 weight parts of (D) an antimony compound.

Patent Document 9 discloses a crystalline polypropylene resin composition that is well suited for applications such as toilet seats and toilet lids and that yields molded articles that have an excellent surface appearance wherein the generation of, e.g., silver streaks and scorching, is inhibited. This composition contains (A) a prescribed crystalline polypropylene and, per 100 weight parts thereof, 1 to 25 weight parts of (B) a propylene-based polymer that has prescribed properties and is constituted of a prescribed component ($\alpha$) that is insoluble in p-xylene at 25° C. and a prescribed component ($\beta$) that is soluble in p-xylene at 25° C.; 3 to 50 weight parts of (C) an organic flame retardant; and 1 to 40 weight parts of (D) an antimony compound.

As previously noted, it is difficult with a general polypropylene-based resin to generate the gloss and marring resistance of ABS resin, and a tactic for dealing with this is to generate gloss, tactile sensation, and marring resistance for polypropylene by incorporating a fatty acid amide-type lubricant such as erucamide (refer, for example, to Patent Document 10).

However, the use of an organic flame retardant, for example, a halogen-type flame retardant, with such blend formulations according to the prior art is still unsatisfactory in terms of performance: for example, a significant brown discoloration may be produced by the co-use of a fatty acid amide-type lubricant such as erucamide with a halogen-type (brominated) flame retardant. As a consequence, there is a strong desire for a thermoplastic resin composition, for example, a polypropylene-based resin composition, that is free of discoloration defects, that is resistant to the staining and deterioration caused by urine, fecal matter, detergents, and so forth, that exhibits an excellent tactile sensation, and that is provided with marring resistance.

CITATION LIST

Patent Literature

Patent Document 1: Japanese Patent Application Laid-open No. H10-287778
Patent Document 2: Japanese Patent Application Laid-open No. 2002-226644
Patent Document 3: WO 2009/072299
Patent Document 4: Japanese Patent Application Laid-open No. 2000-1580
Patent Document 5: Japanese Patent Application Laid-open No. H11-181182
Patent Document 6: Japanese Patent Application Laid-open No. 2003-105144
Patent Document 7: Japanese Patent Application Laid-open No. 2008-074896
Patent Document 8: Japanese Patent Application Laid-open No. 2009-275117
Patent Document 9: Japanese Patent Application Laid-open No. 2009-275118
Patent Document 10: Japanese Patent Application Laid-open No. 2011-144278

SUMMARY OF INVENTION

Technical Problem

Considering the problems described above for the prior art, an object of the present invention is to provide a thermoplastic resin composition, e.g., a polypropylene-based resin composition that, while maintaining an excellent flame retardancy, is free of discoloration defects, is resistant to the staining and deterioration caused by urine, fecal matter, detergents and so forth, exhibits an excellent tactile sensation, and also exhibits an excellent marring resistance and that is thus well suited for toilet components. A further object of the present invention is to provide toilet components comprising this thermoplastic resin composition.

Solution to Problem

The present inventors carried out intensive and extensive investigations in order to solve the above-described problems and discovered as a result that a thermoplastic resin composition—and particularly a polypropylene-based resin composition—provided by incorporating specific proportions of an organic flame retardant as typified by halogen-type flame retardants, a prescribed component as typified by fatty acid esters, and as desired, a flame retardant synergist in a thermoplastic resin as typified by a polypropylene-based resin, when used for toilet components was free of discoloration defects, was resistant to the staining and deterioration caused by urine, fecal matter, detergents and so forth, exhibited an excellent tactile sensation, and also exhibited an excellent marring resistance. The present invention was completed based on this knowledge.

Thus, the first aspect of the present invention provides a thermoplastic resin composition comprising (A) a thermoplastic resin and, per 100 weight parts thereof, (B) 2 to 40 weight parts of an organic flame retardant and 0.1 to 2 weight parts of a component (D), wherein the component (D) satisfies the following condition:

condition: the component (D) is at least one compound selected from the group consisting of polyolefin-based waxes, alcohols, carboxylic acids, and esters, and having a melting point of not more than 100° C. and an HLB value of not more than 5.

The second aspect of the present invention provides the thermoplastic resin composition of the first aspect, wherein the organic flame retardant (B) is a halogen-type flame retardant and the thermoplastic resin composition further comprises (C) 0.1 to 20 weight parts of a flame retardant synergist per 100 weight parts of the thermoplastic resin (A).

In addition, the third aspect of the present invention provides the thermoplastic resin composition of the first or second aspect, wherein the organic flame retardant (B) is a brominated flame retardant.

The fourth aspect of the present invention provides the thermoplastic resin composition according to the second or third aspect, wherein the flame retardant synergist (C) is an antimony compound.

The fifth aspect of the present invention provides the thermoplastic resin composition according to any of the first to fourth aspects, wherein the thermoplastic resin (A) is a polypropylene-based resin.

The sixth aspect of the present invention provides the thermoplastic resin composition according to the fifth aspect, wherein the polypropylene-based resin is a propylene-α-olefin block copolymer or propylene-α-olefin random copolymer that has a melt flow rate (MFR) (230° C., load of 2.16 kg) of 1.0 to 150 g/10 minutes and a non-propylene α-olefin content of 1 to 30 weight %.

The seventh aspect of the present invention provides the thermoplastic resin composition according to any of the first to sixth aspects, wherein the component (D) is a fatty acid ester that has a molecular weight of 350 to 2,000.

The eighth aspect of the present invention provides an injection-moldable thermoplastic resin composition comprising the thermoplastic resin composition according to any of the first to seventh aspects.

The ninth aspect of the present invention provides a toilet component provided by the injection molding of the injection-moldable thermoplastic resin composition according to the eighth aspect.

Advantageous Effects of Invention

When used for toilet components, the thermoplastic resin composition of the present invention does not present discoloration defects, exhibits a suppression of the staining and deterioration caused by urine, fecal matter, detergents and so forth, exhibits an excellent tactile sensation, and exhibits an excellent marring resistance.

DESCRIPTION OF EMBODIMENTS

The thermoplastic resin composition of the present invention is a thermoplastic resin composition comprising (A) a thermoplastic resin and, per 100 weight parts thereof, (B) 2 to 40 weight parts of an organic flame retardant, 0.1 to 2 weight parts of a component (D), and as desired, (C) 0.1 to 20 weight parts of a flame retardant synergist, wherein the component (D) satisfies the following condition:

condition: the component (D) is at least one compound selected from the group consisting of polyolefin-based waxes, alcohols, carboxylic acids, and esters, and having a melting point of not more than 100° C. and an HLB value of not more than 5.

The thermoplastic resin composition of the present invention and toilet components comprising this thermoplastic resin composition are described in detail in the following individual sections.

I. The Thermoplastic Resin Composition

1. The Thermoplastic Resin (A)

The thermoplastic resin (A) used in the present invention is not particularly limited as long as the effects that are the objects of the present invention are achieved. Various thermoplastic resins can be used, while olefin-based resins are preferred and polypropylene-based resins are more preferred, whereamong propylene homopolymers and/or block copolymers and random copolymers of propylene with a non-propylene α-olefin (also referred to below in this Description simply as "propylene-α-olefin copolymers") are preferred. Mixtures of the preceding may also be used.

Propylene-α-olefin copolymers preferred for use are copolymers of propylene and a $C_{2-8}$ α-olefin comonomer excluding propylene and have a propylene content of 70 to 99 weight % (that is, the comonomer content is 1 to 30 weight %), and random copolymers and block copolymers of propylene and α-olefin having a propylene content of at least 90 weight % are more preferred. Mixtures of random copolymers or block copolymers having different α-olefins may also be used.

The non-propylene $C_{2-8}$ α-olefin comonomer that is copolymerized with propylene may be a single such comonomer or a combination of two or more such comonomers may be used.

The propylene-α-olefin copolymer can be specifically exemplified by binary copolymers such as propylene-ethylene copolymers, propylene-1-butene copolymers, propylene-1-pentene copolymers, propylene-1-hexene copolymers, and propylene-1-octene copolymers and by ternary copolymers such as propylene-ethylene-1-butene copolymers and propylene-ethylene-1-hexene copolymers, wherein propylene-ethylene random copolymers, propylene-ethylene-1-butene random copolymers, and so forth are preferred. The content of the α-olefin monomer in the propylene-α-olefin copolymer is generally approximately 0.01 to 30 weight % and is preferably 1 to 30 weight % and more preferably approximately 1 to 10 weight %.

The non-propylene $C_{2-8}$ α-olefin can be exemplified by ethylene, 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, and 1-octene.

Viewed in terms of the moldability, the polypropylene-based resin that is the thermoplastic resin (A) has a melting point of preferably 100 to 170° C., more preferably 120 to 168° C., and even more preferably 150 to 165° C. The melting point of the polypropylene-based resin can be adjusted as appropriate through, for example, the MFR and the type and copolymerization ratio of the non-propylene α-olefin used as a starting material with the propylene. In this Description, the "melting point" is the melting peak temperature measured using a differential scanning calorimeter (DSC).

The melt flow rate (also referred to herebelow as the MFR) based on JIS K 7210 (230° C. measurement temperature, 2.16 kg (21.18 N) load) of the polypropylene-based resin used in the present invention is not particularly limited; however, when the polypropylene-based resin is a propylene-α-olefin block copolymer or propylene-α-olefin random copolymer having a non-propylene α-olefin content of 1 to 30 weight %, the MFR is preferably 1.0 to 150 g/10 minutes, more preferably 5 to 100 g/10 minutes, and even more preferably 10 to 60 g/10 minutes. When the MFR is below 1.0 g/10 minutes, the load during molding is increased and the surface smoothness is impaired and the appearance of the molded article may be degraded. When, on the other hand, 150 g/10 minutes is exceeded, the uniformity of the dispersion of additives in the polypropylene-based resin may deteriorate.

Such a polypropylene-based resin having an isotactic pentad fraction, which indicates its crystallinity, of at least 96% is preferably used in the thermoplastic resin composition suitable for toilet components of the present invention, and an isotactic pentad fraction of at least 97% is more preferred. An isotactic pentad fraction of at least 96% is preferred from the standpoint of the heat resistance. The crystallinity of the polypropylene-based resin can be adjusted through the copolymerization ratio for the starting materials and control of the molecular weight distribution based on the catalyst used.

This isotactic pentad fraction (mmmm) is the value measured by $^{13}$C-NMR (nuclear magnetic resonance). For example, a 270 MHz FT-NMR instrument from JEOL Ltd., may be used.

Methods of producing polypropylene-based resins that are typical examples of the thermoplastic resin (A) used in the thermoplastic resin composition of the present invention are described in the following.

(1) Methods for Producing Propylene-Ethylene Block Copolymers

Methods in which polymerization is run using a highly stereoregular catalyst are preferably used to produce the propylene-ethylene block copolymers used by the present invention. There are no particular limitations on the polymerization process used to obtain the polypropylene-based resin and known polymerization processes can be used. For example, a slurry polymerization method, bulk polymerization method, gas-phase polymerization method, and so forth, may be used. In addition, a batch polymerization method or a continuous polymerization method may be used, and a multistage, e.g., two stage, three stage, and so forth, continuous polymerization method may be used as desired. The propylene-ethylene block copolymer is the reaction mixture of a propylene homopolymer fraction and an ethylene-propylene random copolymer fraction. It is obtained by a production process comprising a polymerization (the first stage) to give the propylene homopolymer fraction, which is a crystalline propylene polymer fraction, and an ensuing polymerization (the second stage) to give the ethylene-propylene random copolymer fraction.

The catalyst used in this polymerization is not particularly limited and, as noted above, known catalysts can be used. For example, a so-called Ziegler•Natta catalyst (described, for example, in The Polypropylene Handbook (first printing, first edition, published 15 May 1998))—in which a titanium compound and organoaluminum are combined—or a metallocene catalyst (refer, for example, to Japanese Patent Application Laid-open No. H5-295022) can be used. Ziegler•Natta catalysts encompass, for example, catalysts provided by the additional activation, by treatment with an electron donor compound, of a titanium compound in the form of a titanium trichloride composition or titanium trichloride obtained by reduction with, for example, an organoaluminum (refer, for example, to Japanese Patent Application Laid-open Nos. S47-34478, S58-23806, and S63-146906) as well as so-called supported catalysts obtained by supporting titanium tetrachloride on a support such as, for example, magnesium chloride (refer, for example, to Japanese Patent Application Laid-open Nos. S58-157808, S58-83006, S58-5310, and S61-218606).

The organoaluminum compound used as a cocatalyst can be exemplified by trialkylaluminums such as trimethylaluminum, triethylaluminum, and triisobutylaluminum; alkylaluminum halides such as diethylaluminum chloride and diisobutylaluminum chloride; alkylaluminum hydrides such as diethylaluminum hydride; alkylaluminum alkoxides such as diethylaluminum ethoxide; alumoxanes such as methylalumoxane and tetrabutylalumoxane; and complex organoaluminum compounds such as lithium tetraethylaluminum. Mixtures of two or more of the preceding may also be used.

Various polymerization additives can be used with these catalysts for the purpose of, for example, improving the stereoregularity, controlling particle morphology, controlling the soluble components, controlling the molecular weight distribution, and so forth. Examples in this regard are electron donor compounds, e.g., organosilicon compounds such as diphenyldimethoxysilane and tert-butylmethyldimethoxysilane; esters such as ethyl acetate, butyl benzoate, methyl p-toluate, and dibutyl phthalate; ketones such as acetone and methyl isobutyl ketone; ethers such as diethyl ether; organic acids such as benzoic acid and propionic acid; and alcohols such as ethanol and butanol.

The polymerization regime can be a slurry polymerization using an inert hydrocarbon, e.g., hexane, heptane, octane, benzene, toluene, and so forth, as the polymerization solvent; a bulk polymerization in which the propylene itself is the polymerization solvent; or a gas-phase polymerization in which the starting propylene is polymerized in the gas-phase state. Polymerization may also be run using a combination of any of the polymerization regimes. Examples in this regard are a method in which the propylene homopolymer fraction is prepared by bulk polymerization and the ethylene-propylene random copolymer fraction is prepared by a gas-phase polymerization, and a method in which the propylene homopolymer fraction is prepared by a bulk polymerization and then a gas-phase polymerization and the ethylene-propylene random copolymer fraction is prepared by a gas-phase polymerization.

The polymerization regime may be executed by a batch technique, continuous technique, or semi-batch technique.

In addition, the shape and structure of the polymerization reactor are not particularly important, and the polymerization reactor can be exemplified by the stirrer-equipped tanks and tubular reactors generally used in slurry polymerizations and bulk polymerizations, the fluidized bed reactors generally used in gas-phase polymerizations, and horizontal reactors equipped with stirring paddles.

In the case of a gas-phase polymerization, the polymerization step for the propylene homopolymer fraction is run in the presence of a catalyst as described above by supplying propylene and hydrogen as a chain-transfer agent, at a temperature of 0 to 100° C., preferably 30 to 90° C., and particularly preferably 40 to 80° C., and a propylene partial pressure of 0.6 to 4.2 MPa, preferably 1.0 to 3.5 MPa, and particularly preferably 1.5 to 3.0 MPa, for a residence time of 0.5 to 10 hours. Within a range in which the effects of the present invention are not impaired, a non-propylene α-olefin may also be copolymerized in the propylene homopolymer fraction; for example, when the α-olefin is ethylene, not more than 7 weight % ethylene may be copolymerized.

The MFR of the propylene homopolymer fraction of the propylene-ethylene block copolymer used in the present invention is generally in the range from 10 to 400 g/10 minutes. In order to bring the MFR of the propylene homopolymer fraction of the propylene-ethylene block copolymer into such a range, adjustment to the desired MFR can be done, although this depends on the type of catalyst, by using the hydrogen chain-transfer agent in the range from $5\times10^{-3}$ to 0.2 as the hydrogen/propylene molar ratio.

To produce the propylene-ethylene block copolymer, in the ensuing second-stage polymerization step, propylene, ethylene and hydrogen are supplied in the presence of the propylene homopolymer fraction produced in the first-stage polymerization step and a random copolymerization of the propylene and ethylene is run in the presence of the aforementioned catalyst (the catalyst used to produce the propylene homopolymer fraction) at 0 to 100° C., preferably 30 to 90° C., and particularly preferably 40 to 80° C. at a propylene partial pressure and an ethylene partial pressure each of 0.1 to 2.0 MPa and preferably 0.1 to 1.5 MPa for a residence time of 0.5 to 10 hours, to produce an ethylene-propylene random copolymer and obtain the propylene-ethylene block copolymer as the final product. An α-olefin other than propylene and ethylene may be copolymerized in the ethylene-propylene random copolymer within a range in which the effects of the present invention are not impaired.

The propylene-ethylene block copolymer used in the present invention has an MFR preferably of 1.0 to 150 g/10 minutes, more preferably 5 to 100 g/10 minute, and even more preferably 10 to 60 g/10 minute. Since, as previously noted, the MFR of the propylene homopolymer fraction is generally in the range from 10 to 400 g/10 minutes, the MFR of the ethylene-propylene random copolymer is preferably $10^{-4}$ to 100 g/10 minutes in order to bring the MFR of the propylene-ethylene block copolymer into the indicated range. In order to control the MFR of the ethylene-propylene random copolymer fraction to $10^{-4}$ to 100 g/10 minutes, adjustment to the desired MFR can be performed, although this depends on the type of catalyst, using the range of $10^{-5}$ to 0.8 for the hydrogen/(propylene+ethylene) molar ratio. The ethylene concentration can be adjusted relative to the propylene concentration in the second stage in order to keep the ethylene content in the ethylene-propylene random copolymer fraction (rubber component) in the prescribed range. In addition, in order to suppress gel production and stickiness, an alcohol such as ethanol is desirably added before or during the reaction for the ethylene-propylene random copolymer fraction. Specifically, it can be carried out at a molar ratio of 0.5 to 3.0 as the alcohol/organoaluminum compound ratio. The proportion of the ethylene-propylene random copolymer fraction in the propylene-ethylene block copolymer can also be controlled by the amount of addition of this alcohol.

Because the propylene-ethylene block copolymer under consideration is available on the market as various commercial products from various companies, the properties of these commercial products can be measured and the desired commercial product can then be used.

(2) Methods for Producing Propylene Homopolymers

The propylene homopolymer used by the present invention may be produced in accordance with the method for producing the propylene homopolymer fraction in the previously described production of propylene-ethylene block copolymers. The propylene homopolymer used in the present invention has an MFR in the range of generally 1.0 to 400 g/10 minutes, preferably 5 to 200 g/10 minute, more preferably 10 to 100 g/10 minute, and even more preferably 15 to 60 g/10 minute. In order to bring the MFR of the propylene homopolymer into such a range, adjustment to the desired MFR can be carried out, although this depends on the type of catalyst, by using the hydrogen chain-transfer agent in the range from $5\times10^{-3}$ to 0.2 as the hydrogen/propylene molar ratio.

(3) Methods for Producing Propylene-Ethylene Random Copolymers

The propylene-ethylene random copolymer used by the present invention may be produced in accordance with the method for producing the ethylene-propylene random copolymer fraction in the previously described production of propylene-ethylene block copolymers. The propylene-ethylene random copolymer used in the present invention has an MFR of preferably 1.0 to 150 g/10 minutes, more preferably 5 to 100 g/10 minute, and even more preferably 10 to 60 g/10 minute. In order to bring the MFR of the propylene-ethylene random copolymer into such a range, adjustment to the desired MFR can be carried out, although this depends on the type of catalyst, by using the hydrogen chain-transfer agent in the range from $10^{-3}$ to 1.5 as the hydrogen/(propylene+ethylene) molar ratio.

2. The Organic Flame Retardant (B)

The organic flame retardant (B) used by the present invention is not particularly limited and various organic flame retardants can be used, e.g., halogen types, phosphorus types, nitrogen types, and so forth. However, halogen-type flame retardants are preferred from the standpoint of the flame retardancy performance and ease of acquisition, and, for example, organic halogenated aromatic compounds, e.g., halogenated diphenyl compounds, halogenated bisphenol-type compounds, halogenated bisphenolbis(alkyl ether)-type compounds, and halogenated phthalimide-type compounds, are preferred and in particular halogenated bisphenolbis(alkyl ether)-type compounds are more preferred.

The halogenated diphenyl compounds can be exemplified by halogenated diphenyl ether compounds, halogenated diphenyl ketone compounds, and halogenated diphenylalkane compounds, whereamong halogenated diphenylalkane compounds such as decabromodiphenylethane are preferred.

The halogenated bisphenol-type compound can be exemplified by halogenated bisphenylalkanes, halogenated bisphenyl ethers, halogenated bisphenyl thioethers, and halogenated bisphenyl sulfones, whereamong halogenated bisphenyl thioethers such as bis(3,5-dibromo-4-hydroxyphenyl) sulfone are preferred.

The halogenated bisphenolbis(alkyl ether)-type compounds can be exemplified by (3,5-dibromo-4-(2,3-dibromopropoxy)phenyl)(3-bromo-4-(2,3-dibromopropoxy)phenyl)methane, 1-(3,5-dibromo-4-(2,3-dibromopropoxy)phenyl)-2-(3-bromo-4-(2,3-dibromopropoxy)phenyl) ethane, 1-(3,5-dibromo-4-(2,3-dibromopropoxy)phenyl)-3-(3-bromo-4-(2,3-dibromopropoxy)phenyl)propane, 2,2-bis (3,5-dibromo-4-(2,3-dibromopropoxy)phenyl)propane, (3,5-dichloro-4-(2,3-dibromopropoxy)phenyl)(3-chloro-4-(2,3-dibromopropoxy)phenyl)methane, 1-(3,5-dichloro-4-(2,3-dibromopropoxy)phenyl)-2-(3-chloro-4-(2,3-dibromopropoxy)phenyl)ethane, 1-(3,5-dichloro-4-(2,3-dibromopropoxy)phenyl)-3-(3-chloro-4-(2,3-dibromopropoxy)phenyl)propane, bis(3,5-dibromo-4-(2,3-dibromopropoxy)phenyl)methane, 1,2-bis(3,5-dibromo-4-(2,3-dibromopropoxy)phenyl)ethane, 1,3-bis(3,5-dibromo-4-(2,3-dibromopropoxy)phenyl)propane, bis(3,5-dichloro-4-(2,3-dibromopropoxy)phenyl)methane, 1,2-bis(3,5-dichloro-4-(2,3-dibromopropoxy)phenyl)ethane, 1,3-bis(3,5-dichloro-4-(2,3-dibromopropoxy)phenyl)propane, 2-bis(3,5-dichloro-4-(2,3-dibromopropoxy)phenyl)propane, (3,5-dibromo-4-(2,3-dibromopropoxy)phenyl) (3-bromo-4-(2,3-dibromopropoxy)phenyl) ketone, (3,5-dichloro-4-(2,3-dibromopropoxy)phenyl) (3-chloro-4-(2,3- dibromopropoxy)phenyl) ketone, bis(3,5-dibromo-4-(2,3-dibromopropoxy)phenyl) ketone, bis(3,5-dichloro-4-(2,3-dibromopropoxy)phenyl) ketone, (3,5-dibromo-4-(2,3-dibromopropoxy)phenyl) (3-bromo-4-(2,3-dibromopropoxy)phenyl) ether, (3,5-dichloro-4-(2,3-dibromopropoxy)phenyl) (3-chloro-4-(2,3-dibromopropoxy)phenyl) ether, bis(3,5-dibromo-4-(2,3-dibromopropoxy)phenyl) ether, bis(3,5-dichloro-4-(2,3-dibromopropoxy)phenyl) ether, (3,5-dibromo-4-(2,3-dibromopropoxy)phenyl (3-bromo-4-(2,3-dibromopropoxy)phenyl)thioether, (3,5-dichloro-4-(2,3-dibromopropoxy)phenyl) (3-chloro-4-(2,3-dibromopropoxy)phenyl)thioether, bis(3,5-dibromo-4-(2,3-dibromopropoxy)phenyl)thioether, bis(3,5-dichloro-4-(2,3-dibromopropoxy)phenyl)thioether, (3,5-dibromo-4-(2,3-dibromopropoxy)phenyl) (3-bromo-4-(2,3-dibromopropoxy)phenyl) sulfone, (3,5-dichloro-4-(2,3-dibromopropoxy)phenyl) (3-chloro-4-(2,3-dibromopropoxy)phenyl) sulfone, bis(3,5-dibromo-4-(2,3-dibromopropoxy)phenyl) sulfone, bis(3,5-dichloro-4-(2,3-dibromopropoxy)phenyl) sulfone, whereamong brominated bisphenol A (brominated aliphatic ether), brominated bisphenol S (brominated aliphatic ether), chlorinated bisphenol A (chlorinated aliphatic ether), chlorinated bisphenol S (chlorinated aliphatic ether) and particularly etherized tetrabromobisphenol A and etherized tetrabromobisphenol S are preferred.

Etherized tetrabromobisphenol A can be exemplified by tetrabromobisphenol A bis(2,3-dibromopropyl ether) and 2,2-bis(3,5-dibromo-4-(2,3-dibromopropoxy)phenyl)propane. Etherized tetrabromobisphenol S can be exemplified by bis(3,5-dibromo-4-(2,3-dibromopropoxy)phenyl) sulfone.

Brominated flame retardants are preferred among these halogen-type flame retardants because they provide a high flame retardancy effect and because, during production and molding of the thermoplastic resin composition of the present invention, they exhibit little decomposition even in view of the thermal history.

A single one of these halogen-type flame retardants may be used or two or more may be used in combination. For example, a halogenated diphenyl compound may be used in combination with a halogenated bisphenol-type compound.

In addition, another organic flame retardant that does not correspond to a halogen-type flame retardant, for example, a phosphorus type or a nitrogen type, may also be used in combination with the halogen-type flame retardant.

Moreover, another organic flame retardant, e.g., a phosphorus type or a nitrogen type, may be used without using a halogen-type flame retardant.

The organophosphorus-type flame retardant may be any organophosphorus-type flame retardant that is commonly used as a flame retardant for thermoplastic resins and specifically for polyolefins. Examples here are compounds modified by various substituents, e.g., trimethyl phosphate, triethyl phosphate, tripropyl phosphate, tributyl phosphate, tripentyl phosphate, trihexyl phosphate, tricyclohexyl phosphate, trixylenyl phosphate, cresyl diphenyl phosphate, dicresyl phenyl phosphate, dimethyl ethyl phosphate, methyl dibutyl phosphate, ethyl dipropyl phosphate, and hydroxyphenyl diphenyl phosphate; as well as phosphate salt compounds, phosphazene derivatives containing phosphorus and nitrogen, and mixtures of the preceding.

The nitrogen-type flame retardant can be exemplified by compounds such as melamine, piperazine, N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, trans-2,5-dimethylpiperazine, 1,4-bis(2-aminoethyl)piperazine, 1,4-bis(3-aminopropyl)piperazine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, 2-amino-4,6-dimercapto-1,3,5-triazine, ammeline, phthalodiguanamine, melamine cyanurate, melamine pyrophosphate, butylenediguanamine, norbornenediguanamine, methylenediguanamine, ethylenedimelamine, trimethylenedimelamine, tetramethylenedimelamine, hexamethylenedimelamine, and 1,3-hexylenedimelamine. Commercial products can be exemplified by ADK STAB FP2000, FP2100, and FP2200 from the Adeka Corporation and ammonium polyphosphate.

When a halogen-type flame retardant is used in combination with various flame retardants such as phosphorus types and nitrogen types, a single one of these organic flame retardants may be used or two or more may be used in combination. For example, an organic halogen-type flame retardant and an organophosphorus flame retardant may also be used in combination with a halogenated diphenyl compound and a halogenated bisphenol-type compound. In particular, a satisfactory flame retardancy effect may not be obtained when a nitrogen-type flame retardant is used by itself. However, when, in such a case, a nitrogen-type flame retardant is used in combination with a phosphorus-type flame retardant, the nitrogen-type flame retardant can function as a flame retardant synergist for the phosphorus-type flame retardant and a satisfactory flame retardancy effect may then be obtained. Thus, the use of combinations of these organic flame retardants can also be regarded as effective means for obtaining the effects of the present invention.

When these other organic flame retardants, e.g., phosphorus types, nitrogen types, and so forth, are used without using a halogen-type flame retardant, a single such organic flame retardant may be used or two or more may be used in combination.

The content of the organic flame retardant (B) in the thermoplastic resin composition of the present invention, expressed per 100 weight parts of the thermoplastic resin (A), is 2 to 40 weight parts, preferably 2 to 30 weight parts, and more preferably 2 to 25 weight parts. There is little effect with regard to improving the flame retardancy when the content of the organic flame retardant (B) is less than 2 weight parts. On the other hand, when 40 weight parts is exceeded, the flame retardancy effect is saturated, and, in the particular case that the thermoplastic resin composition is a polypropylene-based resin composition, the mechanical properties, economics, and moldability, e.g., the production of silver streaks and scorching during molding, may be negatively influenced. As a consequence, a suitable selection is made from the particular range indicated above.

Because these organic flame retardants (B) are commercially available from a number of companies in the form of various products, it may be possible to acquire a particular desired product and such products can therefore be purchased and used.

3. The Flame Retardant Synergist (C)

There are no particular limitations on the flame retardant synergist (C) used on an optional basis in the thermoplastic resin composition of the present invention and various compounds can be used here, whereamong antimony compounds are preferred. The flame retardant synergist (C), which is typified by antimony compounds, is used to raise the flame retardancy effect through its incorporation in the thermoplastic resin (A) in combination with the halogen-type flame retardant that is an organic flame retardant (B).

Representative examples of specific antimony compounds are, for example, antimony trioxide, antimony pentoxide, antimony halides such as antimony trichloride and antimony pentachloride, as well as antimony trisulfide, antimony pentasulfide, sodium antimonate, antimony tartrate, and so forth.

Metallic antimony is also encompassed by the antimony compounds in the present invention. Antimony trioxide is preferred for the antimony compound used in the present invention.

A single one of these flame retardant synergists (C) may be used by itself or two or more may be used in combination.

The content of the optionally used flame retardant synergist (C) in the thermoplastic resin composition of the present invention, expressed with reference to 100 weight parts of the thermoplastic resin (A), is 0.1 to 20 weight parts, preferably 0.5 to 20 weight parts, more preferably 0.8 to 15 weight parts, and particularly preferably 1 to 10 weight parts. There is little effect with regard to improving the flame retardancy when the content of the flame retardant synergist (C) is less than 0.1 weight parts. On the other hand, when 20 weight parts is exceeded, the flame retardancy effect is saturated and there are negative effects on the economics, the moldability, e.g., the production of silver streaks and scorching during molding, and the mechanical properties of the polypropylene-based resin composition that is the thermoplastic resin composition. As a consequence, a suitable selection is made from the particular range indicated above.

The flame retardant synergist (C) achieves flame retardancy in combination with the halogen-type flame retardant that is an organic flame retardant (B), and it is preferably used in the range from 30 to 60 weight % with reference to the total weight of the organic flame retardant (B) and the flame retardant synergist (C).

Because these flame retardant synergists (C) are commercially available from a number of companies in the form of various products, it may be possible to acquire a particular desired product and such products can therefore be purchased and used.

4. Component (D)

The component (D) used in the thermoplastic resin composition of the present invention is at least one compound selected from the group consisting of (i) polyolefin-based waxes, (ii) alcohols, (iii) carboxylic acids, and (iv) esters and having a melting point of not more than 100° C. and an HLB value of not more than 5.

The melting point of component (D) does not exceed 100° C. and preferably does not exceed 90° C. In addition, component (D) has a melting point generally of at least 30° C. and preferably of at least 40° C. in particular for handling as a solid.

Component (D) has an HLB value of not more than 5. A lower HLB value provides a higher lipophilicity and a better water repellency and staining resistance can therefore be expected. As a consequence, there is no particular lower limit on the HLB value and as a practical matter anything above 0 is preferably used.

There are no particular limitations on the polyolefin-based wax (i) as long as the effects of the present invention are achieved, and various products as typified by polyethylene waxes can be provided as examples.

In addition, synthetic waxes, e.g., paraffin waxes, microcrystalline waxes, liquid paraffins, and paraffins and their mixtures are known as so-called waxes, and these waxes may also be correspondingly used in the present invention insofar as the same effects are achieved as with polyolefin-based waxes.

There are no particular limitations on the alcohols (ii) as long as the effects of the present invention are achieved, and so-called higher alcohols and their mixtures can be used.

These alcohols can be exemplified by octyl alcohol, decyl alcohol, lauryl alcohol, coconut alcohol, myristyl alcohol, palmityl alcohol, and stearyl alcohol.

The carboxylic acids (iii) can be exemplified by unsaturated carboxylic acids, e.g., acrylic acid, methacrylic acid, maleic acid, fumaric acid, maleic anhydride, and itaconic anhydride, as well as by methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, monomethyl maleate, monoethyl maleate, diethyl maleate, monomethyl fumarate, glycidyl acrylate, and glycidyl methacrylate.

There are no particular limitations on the esters (iv), while fatty acid esters are preferred, for example, the mono- and diesters of glycerol with fatty acids, the mono-, di-, and triesters of sorbitan with fatty acids, and the pentaerythritol esters of fatty acids. Both complete and partial fatty acid esters are suitably used for the fatty acid ester.

Saturated and unsaturated fatty acids having a molecular weight of approximately 26 to 300, e.g., oleic acid (C18, unsaturated), stearic acid (C18), palmitic acid (C16), myristic acid (C14), lauric acid (C12), erucic acid (C22, unsaturated), and behenic acid (C22), can be used as the fatty acid in the fatty acid ester, and higher fatty acids having at least 12 carbons are preferred.

The alcohol in the fatty acid ester can be exemplified by alkylene glycols such as propylene glycol (dihydric) as well as neopentyl glycol (dihydric), glycerol (trihydric), trimethylolpropane (trihydric), sorbitan (tetrahydric)(or sorbitol), and pentaerythritol (tetrahydric).

Specific examples are the glycerol esters of fatty acids such as glycerol monostearate, glycerol monolaurate, glycerol monopalmitate, glycerol monomyristate, glyceryl distearate, and diglycerol monostearate; pentaerythritol esters such as di(pentaerythritol distearate), di(pentaerythritol dilaurate), pentaerythritol monostearate, and pentaerythritol distearate; sorbitan fatty acid esters; and propylene glycol fatty acid esters.

The molecular weight of the fatty acid ester used in the present invention is generally 350 to 20,000 and preferably 350 to 2,000.

In addition, the fatty acid ester, as noted above, has an HLB value of not more than 5. A lower HLB value provides a higher lipophilicity and a better water repellency and staining resistance can therefore be expected. As a consequence, there is no particular lower limit on the HLB value and as a practical matter anything above 0 is preferably used. When the molecular weight and HLB value of the fatty acid ester-type lubricant (D) are in the indicated ranges, the lubricant performance, infra, staining resistance, discoloration resistance, and bleed behavior to the molding surface are also excellent, and hence this is preferred. Thus, fatty acid esters with molecular weights of 350 to 2,000 are particularly preferred for component (D).

Preferred fatty acid esters can be exemplified by glycerol monostearate (HLB=4.3), glycerol mono-•distearate (HLB=3.2), glycerol monopalmitate (HLB=4.3), glycerol mono-•dipalmitate (HLB=3.2), glycerol monobehenate (HLB=4.2), glycerol mono-•dibehenate (HLB=2.8), glycerol monooleate (HLB=4.3), glycerol mono-•dioleate (HLB=3.1), sorbitan tristearate (HLB=3.0), sorbitan oleate (HLB=4.9), sorbitan trioleate (HLB=3.0), sorbitan tribehenate (HLB=2.5), propylene glycol monolaurate (HLB=4.2), propylene glycol monopalmitate (HLB=3.8), propylene glycol monostearate (HLB=3.7), propylene glycol monooleate (HLB=3.6), propylene glycol monobehenate (HLB=3.4), pentaerythritol adipate-stearate polymer (HLB≤1), pentaerythritol tetrastearate (HLB≤1), and stearyl stearate (HLB≤1). Various products for these fatty acid esters can be acquired as commercial products from a number of companies, e.g., Riken Vitamin Co., Ltd.

A single one of these fatty acid esters may be used or a mixture of two or more may be used, and, within a range in which the effects of the present invention are not impaired, they may also be used in combination with non-fatty acid ester compounds that are commonly used as lubricants.

The content of component (D) in the thermoplastic resin composition of the present invention, expressed per 100 weight parts of the thermoplastic resin (A), is 0.1 to 2 weight parts and is preferably 0.2 to 1.5 weight parts and more preferably 0.2 to 1 weight part. There is no effect on the stain resistance and marring resistance when the component (D) content is less than 0.1 weight parts, while the tactile sensation is impaired due to bleed out to the surface at above 2 weight parts, and hence both are unfavorable.

Component (D) functions in the present invention mainly as a lubricant in the process of molding the thermoplastic resin composition. Many other compounds are known as compounds that can be used as such a lubricant. Silicone compounds are a typical example in this regard, but these are unfavorable because they may lower the flame retardancy that is an object of the present invention.

Moreover, in addition to this lubricant function, in the present invention component (D) also makes a substantial contribution to the staining resistance, marring resistance, discoloration resistance, and anti-scorching effect, and the staining resistance, marring resistance, discoloration resistance, and anti-scorching effect are of course quite important in the present invention. Thus, with a molded article of the thermoplastic resin composition, this component gradually bleeds to the surface of the molded article and forms a thin coating on the surface. As a result, direct contact by an individual, e.g., with a bare hand, with the surface of the molded article is prevented, and this also has an effective activity with regard to the staining resistance, discoloration resistance, and anti-scorching effect.

Because compounds that can be used as this component (D) are commercially available from a number of companies in the form of various products, it may be possible to acquire a particular desired product and such products can therefore be purchased and used.

5. Other Additives (E)

The additives (E) that are the optional components commonly used in thermoplastic resins as typified by polypropylene-based resins may as necessary be incorporated, as appropriate and within a range in which the objects of the present invention are not impaired, in the thermoplastic resin composition of the present invention.

These additives (E) can be exemplified by nucleating agents, molecular weight modifiers, foaming agents, pigments, dispersing agents, ultraviolet absorbers, antioxidants, static inhibitors, neutralizing agents, metal deactivators, stabilizers, antimicrobials, inorganic fillers, rubbery components, and so forth.

The nucleating agents can be specifically exemplified by aromatic aluminum salt nucleating agents, aromatic sodium salt nucleating agents, aromatic phosphate metal salt nucleating agents, sorbitol-type nucleating agents, talc, and so forth.

A known organic pigment or inorganic pigment can be used as the pigment under consideration. Specific examples are organic pigments such as azo types, anthraquinone types, phthalocyanine types, quinacridone types, isoindolinone types, dioxazine types, perinone types, quinophthalone types, perylene types, and so forth, and inorganic pigments such as ultramarine, titanium oxide, titanium yellow, iron oxide (iron oxide red), chromium oxide, zinc oxide, carbon black, and so forth. While various pigments may be added as an optional component to the thermoplastic resin composition of the present invention, even better effects can be generated for the thermoplastic resin composition of the present invention using, among the various pigments, lightly colored pigment systems in which titanium oxide is the major component.

Any organic antimicrobial or inorganic antimicrobial may be used as the aforementioned antimicrobial. Organic antimicrobials can be exemplified by chlorine-type, phenol-type, imidazole-type, and thiazole-type compounds and by quaternary ammonium compounds. The inorganic antimicrobials can be exemplified by antimicrobials in which a metal such as silver or zinc is incorporated in and supported by a zeolite system, apatite system, silica-alumina system, ceramic system, zirconium phosphate system, silica gel system, hydroxyapatite system, calcium silicate system, and so forth.

The aforementioned inorganic filler can be specifically exemplified by talc, barium sulfate, clay, silica, calcium carbonate, magnesium carbonate, aluminum hydroxide, magnesium hydroxide, glass fiber, whiskers, and so forth, while the aforementioned rubbery component can be specifically exemplified by ethylene-propylene rubbers, ethylene-1-butene rubbers, ethylene-hexene rubbers, ethylene-octene rubbers, and styrene-butadiene rubbers.

Stiffness, a substantial feel, and impact resistance can be imparted to the resulting thermoplastic resin composition suitable for toilet components by the addition of this inorganic filler and rubbery component, either individually or in combination, for example, by the addition, per 100 weight parts of the thermoplastic resin, of the inorganic filler in the range from 1 to 250 weight parts and preferably 5 to 200 weight parts and the rubbery component in the range from 1 to 20 weight parts and preferably 3 to 15 weight parts.

Because these additives (E) are commercially available from a number of companies in the form of various products, it may be possible to acquire a particular desired product for use.

6. Methods for Producing the Thermoplastic Resin Composition

The method of producing the thermoplastic resin composition of the present invention can be exemplified by the following: methods in which the prescribed amounts of the organic flame retardant (B), component (D), as desired the flame retardant synergist (C), and the optionally used additive(s) (E) are directly added to a powder or pellets of the thermoplastic resin (A) as typified by polypropylene-based resins; methods in which a masterbatch is preliminarily prepared from a powder of the thermoplastic resin (A) as typified by polypropylene-based resins, the organic flame retardant (B) in the form of a halogen-type flame retardant, the flame retardant synergist (C), component (D), and the optionally used additive(s) (E), and this masterbatch is added to pellets of the thermoplastic resin (A) as typified by polypropylene-based resins.

The thermoplastic resin composition of the present invention is obtained by mixing and then melt-mixing/kneading the thermoplastic resin (A), organic flame retardant (B), component (D), flame retardant synergist (C) as desired, and optionally used additive(s) (E).

Known methods can be used for mixing, e.g., a tumbler mixer, Super mixer, Henschel mixer, screw blender, ribbon blender, and so forth. There are no particular limitations on the melt-mixing/kneading as long as a method is used that performs melt-mixing/kneading at a temperature that is at least the melting point of the thermoplastic resin (A), using, for example, a melt extruder, Banbury mixer, and so forth.

II. The Thermoplastic Resin Moldings

The thermoplastic resin moldings may be obtained by molding the thermoplastic resin composition of the present invention using various molding methods, e.g., injection molding and so forth; however, the thermoplastic resin composition of the present invention, considering its excellent moldability and the low discoloration of its moldings, is well adapted for use as an injection-moldable thermoplastic resin composition. With regard to the molding conditions, and when, for example, the molding method is injection molding, the performance thereof may be in the same manner as for known injection molding procedures for thermoplastic resins. When, for example, the thermoplastic resin (A) is a polypropylene-based resin, molding can be carried out using the following conditions: resin temperature of 190 to 230° C., mold temperature of 10 to 80° C., injection speed of 0.2 to 20 seconds, injection pressure of 50 to 70 MPa, and a molding cycle of 20 to 200 seconds.

In comparison to conventional products, thermoplastic resin moldings obtained from the thermoplastic resin composition of the present invention have a better surface appearance, support a reduction in the defect rate due to the generation of scorching defects during molding, have a satisfactory flame retardancy on their own, and present a better molding processability.

The applications of injection molded articles obtained from the thermoplastic resin composition of the present invention can be exemplified by components in household electrical appliances such as rice cookers, vacuum cleaners, washing machines, refrigerators, fans, air conditioners, and so forth, and by components for household goods such as vanities and dressers, ventilation fans, toilet seats, toilet lids, and housings for devices used as attachments or accessories. Within the field of components for household goods, a particularly preferred field of application can be exemplified by toilet components such as toilet seats, toilet lids, the main casing for warm water washing devices, operating part housings, and so forth.

With regard in particular to the method for producing a toilet component using the thermoplastic resin composition of the present invention, the same methods can be used as are used to produce toilet components using common polypropylene-based resin compositions. Examples here are methods for molding a desired toilet component by, e.g., subjecting pellets of the thermoplastic resin composition of the present invention to injection molding, injection compression molding, blow molding, sheet molding, and so forth.

The injection molding here encompasses, for example, gas-assist injection molding methods, two-layer (two color) injection molding methods, and sandwich injection molding methods.

Among toilet components obtained by molding the thermoplastic resin composition of the present invention, toilet components obtained by injection molding in particular exhibit, in comparison to conventional articles, a better gloss and stiffness, less staining and discoloration due to urine, fecal matter, detergents, and so forth, and a better tactile sensation. In addition, they exhibit little detergent-induced deterioration and thus have an excellent detergent resistance and in addition also have an excellent resistance to thermal ageing and as a consequence provide even better effects when used for components for heated toilets in addition to components for ordinary toilets.

EXAMPLES

The present invention is more specifically described by the examples that follow; however, the examples provided below are simply examples of embodiments of the present invention and the present invention is not limited to or by the following examples.

The designations and properties of the individual components of the starting materials used in the following examples and comparative examples are provided below.

<Starting Materials Used>

1. The Thermoplastic Resin (A)

A-1: Novatec-PP BCO3C from Japan Polypropylene Corporation (block copolymer with an ethylene content of 4.8 weight %, MFR=30 g/10 minutes, isotactic pentad fraction (mmmm fraction)=0.98)

A-2: Novatec-PP MA04 from Japan Polypropylene Corporation (propylene homopolymer, MFR=40 g/10 minutes, isotactic pentad fraction (mmmm fraction)=0.98)

A-3: Novatec-PP from Japan Polypropylene Corporation (block copolymer with an ethylene content of 3.0 weight %, MFR=120 g/10 minutes, isotactic pentad fraction (mmmm fraction)=0.98)

A-4: Novatec-PP EC9 from Japan Polypropylene Corporation (block copolymer with an ethylene content of 5.0 weight %, MFR=0.5 g/10 minutes, isotactic pentad fraction (mmmm fraction)=0.98)

A-5: propylene-ethylene random copolymer with an ethylene content of 3.0 weight %, from Japan Polypropylene Corporation, MFR=7.0 g/10 minutes 2. The Organic Flame Retardant (B)

B-1: Nonnen 52 {bis[3,5-dibromo-4-(2,3-dibromopropoxy)phenyl]sulfone}, from Marubishi Oil Chemical Co., Ltd.

B-2: SAYTEX8010 [bis(pentabromophenyl)ethane], from the Albemarle Corporation

B-3: FP2200 (phosphate ester-type flame retardant), from the ADEKA Corporation

3. The Flame Retardant Synergist (C)

C-1: Antimony trioxide (FIRE CUT AT3 from Suzuhiro Chemical Co., Ltd.)

4. Component (D)

(1) Fatty Acid Ester-Type Lubricants and Other Lubricants

Table 1 gives the fatty acid ester-type lubricants and other lubricants that were used.

TABLE 1

| component (D) | designation lubricant | molecular weight | HLB | melting point |
|---|---|---|---|---|
| D-1 | glycerol monostearate | 350 | 4.3 | 64 |
| D-2 | glycerol mono- • dibehenate | 500 | 2.8 | 74 |
| D-3 | glycerol di- • tristearate | 680 | 1.8 | 56 |
| D-4 | glycerol tristearate | 890 | ≤1 | 68 |
| D-5 | glycerol tri(12-hydroxystearate) | 940 | ≤1 | 82 |
| D-6 | sorbitan tribehenate | 1,900 | 2.5 | 69 |
| D-7 | pentaerythritol adipate polymer | 18,000 | ≤1 | 55 |

TABLE 1-continued

| component (D) | designation lubricant | molecular weight | HLB | melting point |
|---|---|---|---|---|
| D-8 | pentaerythritol tetrastearate | 1,150 | ≤1 | 64 |
| D-9 | stearyl stearate | 550 | ≤1 | 56 |
| D-10 | erucamide | 330 | — | 80 |
| D-11 | silicone resin | — | ≤1 | — |

D-1 to D-9 are products of Riken Vitamin Co., Ltd.; D-10 is a product of Nippon Fine Chemical Co., Ltd.; and D-11 is a product of Dow Corning Toray Co., Ltd.

5. The Other Additive(s) (E)

Each of the following were additionally incorporated as additives in the thermoplastic resin compositions, expressed per 100 weight parts of the polypropylene-based resin used as the thermoplastic resin (A): 0.1 weight parts of an antioxidant (E-1: Irganox 1010 from BASF) and 0.1 weight parts of a phosphorus-type heat stabilizer (E-2: Irgafos 168 from BASF).

The thermoplastic resin compositions in the following examples and comparative examples were prepared as follows.

The component (A) polypropylene-based resin and the prescribed quantities of components (B), (C), and (D) and optional components (E) were introduced as a single charge to a Henschel mixer and thorough stirring and mixing was performed for 3 minutes. The obtained blended composition was melt-mixed/kneaded at a set temperature of 200° C. and a resin temperature of 200° C. using an extruder (twin-screw extruder from The Japan Steel Works, Ltd., diameter=30 mm) and a polypropylene-based resin composition was obtained in pellet form.

The methods used in the following examples and comparative examples for property evaluation are described in the following.

(1) Molding of the Test Specimens

Using a resin temperature of 200° C. and a mold cooling temperature of 40° C., the pelletized thermoplastic resin composition obtained as described above was molded using an injection molder (IS100 from the Toshiba Corporation) into a sheet test specimen (120×120×3 mmt) and a combustion test specimen (125×15×3 mmt).

(2) Discoloration Testing (Scorching Characteristics During Molding)

The scorching characteristics during molding were evaluated using the following procedure.
(i) Residence for 30 minutes in the cylinder of the injection molder at a molding temperature of 210° C.
(ii) Production (1 cycle 1 minute) of the test specimen by regular molding.
(iii) Visual checking of the test specimen.
(Evaluation Scale)
○: Almost no discoloration is observed.
Δ: Some discoloration is observed, but it is not problematic from a practical standpoint.
x: Substantial discoloration is observed.

(3) the Flame Retardancy (Combustion Test)

The flame retardancy was evaluated according to the UL-94 standard.

(4) the Stain Resistance

The stain resistance was evaluated using the following procedure.
(i) 0.2 g of a commercially available instant coffee is dissolved as the staining component in 140 mL distilled water and 15 μL is dripped onto the test specimen.
(ii) Drying is carried out for 60 minutes at 40° C.
(iii) Rubbing is performed 5 times with dry toilet tissue and the state of the surface is inspected.
(Evaluation Scale)
○: The stain is completely wiped off.
Δ: The stain is partially wiped off.
x: The stain is not wiped off.

(5) the Water Repellency

The water repellency was evaluated using the following procedure in accordance with JIS K 6768-1999.
(i) 2 μL distilled water is dripped onto the test specimen.
(ii) Allow to stand for 1 minute.
(iii) The angle of the liquid surface was measured.
A larger angle for the liquid surface here is taken to be indicative of a better water repellency.

(6) the Marring Resistance

The marring resistance was evaluated using the following procedure.
(i) A 5-finger scratch test was run using an instrument from Rockwood Systems and Equipment, Inc.
(ii) This was run at test loads of 0.6 N, 2 N, 3 N, 6 N, and 10 N, and the evaluation was subsequently carried out by reading the maximum load at which whitening was not seen upon inspection of the surface.

Below, "polypropylene alone" refers to the results when, for the A-1 to A-5 used, a test specimen was similarly fabricated for them alone without any addition and this test specimen was evaluated.
(Evaluation Scale)
○: The maximum load is larger than for the polypropylene alone.
Δ: The maximum load is the same as for the polypropylene alone.
x: The maximum load is smaller than for the polypropylene alone.

(7) the Tackiness Test

The sheet test specimen was heated for 168 hours at 70° C. using a gear oven in accordance with JIS K 7212-B and was equilibrated for 24 hours at 23° C. followed by evaluation of the tackiness by touch.
(Evaluation Scale)
○: Almost no tackiness is perceived.
Δ: Some tackiness is perceived.
x: A sticky tackiness is perceived.

(8) the Molding Processability

The presence/absence of molding defects during fabrication of the sheet test specimen was evaluated.
○: Molding defects are not present.
x: A molding defect such as a short shot and so forth is present.

Examples 1 to 18

The polypropylene-based resin and individual blend components were blended in the proportions shown in Table 2 followed by melt-mixing/kneading, pelletization, fabrication of the test specimens using the methods described in the preceding, and property evaluation. The results are given in Table 2.

Comparative Examples 1 to 9

The polypropylene-based resin and individual blend components were blended in the proportions shown in Table 3 followed by melt-mixing/kneading, pelletization, fabrication of the test specimens using the methods described in the preceding, and property evaluation. The results are given in Table 3.

TABLE 2

| | component | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|---|---|---|---|---|---|---|---|
| polypropylene-based resin (A) (wt. pts.) | A-1 | 100 | 100 | 100 | 100 | 100 | 100 | 100 | 100 | 100 | 100 | 100 | 100 | 100 | 100 | 100 | | | |
| | A-2 | | | | | | | | | | | | | | | | 100 | | |
| | A-3 | | | | | | | | | | | | | | | | | 100 | |
| | A-4 | | | | | | | | | | | | | | | | | | |
| | A-5 | | | | | | | | | | | | | | | | | | 100 |
| flame retardant (B) | B-1 | 2.5 | 2.5 | 2.5 | 2.5 | 2.5 | 2.5 | 2.5 | 2.5 | 2.5 | 2.5 | 20 | 2.5 | 2.5 | | | 2.5 | 2.5 | 2.5 |
| | B-2 | | | | | | | | | | | | | | 40 | | | | |
| | B-3 | | | | | | | | | | | | | | | 26 | | | |
| flame retardant synergist (C) | C-1 | 1.2 | 1.2 | 1.2 | 1.2 | 1.2 | 1.2 | 1.2 | 1.2 | 1.2 | 1.2 | 10 | 1.2 | 1.2 | 14 | | 1.2 | 1.2 | 1.2 |
| lubricant (D) | D-1 | 0.4 | | | | | | | | | 0.8 | 0.4 | 0.2 | 1.8 | 0.4 | 0.4 | 0.4 | 0.4 | 0.4 |
| | D-2 | | 0.4 | | | | | | | | | | | | | | | | |
| | D-3 | | | 0.4 | | | | | | | | | | | | | | | |
| | D-4 | | | | 0.4 | | | | | | | | | | | | | | |
| | D-5 | | | | | 0.4 | | | | | | | | | | | | | |
| | D-6 | | | | | | 0.4 | | | | | | | | | | | | |
| | D-7 | | | | | | | 0.4 | | | | | | | | | | | |
| | D-8 | | | | | | | | 0.4 | | | | | | | | | | |
| | D-9 | | | | | | | | | 0.4 | | | | | | | | | |
| | D-10 | | | | | | | | | | | | | | | | | | |
| | D-11 | | | | | | | | | | | | | | | | | | |
| other additives (E) | | | | | | | | | | | | | | | | | | | |
| antioxidant | E-1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| phosphorus-type stabilizer | E-2 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| evaluations | | | | | | | | | | | | | | | | | | | |
| discoloration testing (scorching characteristics during molding) | | ○ | ○ | ○ | ○ | ○ | ○ | Δ | ○ | ○ | ○ | ○ | ○ | ○ | ○ | ○ | ○ | ○ | ○ |
| combustibility (flame retardancy) | | V-2 | V-2 | V-2 | V-2 | V-2 | V-2 | V-2 | V-2 | V-2 | V-2 | V-0 | V-2 | V-2 | V-0 | V-0 | V-2 | V-2 | V-2 |
| stain resistance | | ○ | Δ | Δ | ○ | ○ | ○ | Δ | ○ | ○ | ○ | ○ | ○ | ○ | ○ | ○ | ○ | ○ | ○ |
| water repellency (contact angle) | | 98 | 80 | 97 | 100 | 105 | 105 | 105 | 103 | 97 | 85 | 92 | 96 | 97 | 95 | 92 | 101 | 101 | 90 |
| marring resistance | | ○ | ○ | ○ | ○ | ○ | ○ | ○ | ○ | ○ | ○ | ○ | ○ | ○ | ○ | ○ | ○ | ○ | Δ |
| tackiness test | | ○ | ○ | ○ | ○ | ○ | ○ | ○ | ○ | ○ | ○ | ○ | ○ | Δ | ○ | ○ | ○ | ○ | ○ |
| molding processability | | ○ | ○ | ○ | ○ | ○ | ○ | ○ | ○ | ○ | ○ | ○ | ○ | ○ | ○ | ○ | ○ | ○ | ○ |

TABLE 3

| | component | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| polypropylene-based resin (A) (wt. pts.) | A-1 | 100 | 100 | 100 | 100 | 100 | 100 | 100 | 100 | |
| | A-2 | | | | | | | | | |
| | A-3 | | | | | | | | | |
| | A-4 | | | | | | | | | 100 |
| | A-5 | | | | | | | | | |
| flame retardant (B) | B-1 | | 2.5 | 2.5 | 1 | 2.5 | 2.5 | 2.5 | | 2.5 |
| | B-2 | | | | | | | | | |
| | B-3 | | | | | | | | 45 | |
| flame retardant synergist (C) | C-1 | | 1.2 | 1.2 | 0.5 | 1.2 | 1.2 | 1.2 | | 1.2 |
| lubricant (D) | D-1 | | | | 0.4 | 0.05 | 2.5 | | 0.4 | |
| | D-2 | | | | | | | | | |
| | D-3 | | | | | | | | | |
| | D-4 | | | | | | | | | |
| | D-5 | | | | | | | | | |
| | D-6 | | | | | | | | | |
| | D-7 | | | | | | | | | |
| | D-8 | | | | | | | | | |
| | D-9 | | | | | | | | | |

TABLE 3-continued

| | component | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| | D-10 | | | 0.4 | | | | | | |
| | D-11 | | | | | | | 2 | | |
| other additives (E) | | | | | | | | | | |
| antioxidant | E-1 | 0.1 | 0.1 | 0.1 | 0.1 | 0.1 | 0.1 | 0.1 | 0.1 | 0.1 |
| phosphorus-type stabilizer | E-2 | 0.1 | 0.1 | 0.1 | 0.1 | 0.1 | 0.1 | 0.1 | 0.1 | 0.1 |
| evaluations | | | | | | | | | | |
| discoloration test (scorching characteristics during molding) | | ○ | ○ | x | ○ | ○ | ○ | ○ | x | ○ |
| combustibility (flame retardancy) | | HB | V-2 | V-2 | HB | V-2 | V-2 | HB | V-0 | V-2 |
| stain resistance | | x | x | ○ | ○ | x | x | ○ | ○ | ○ |
| water repellency (contact angle) | | 70 | 77 | 92 | 107 | 80 | 102 | 105 | 86 | 76 |
| marring resistance | | x | x | ○ | ○ | x | ○ | ○ | ○ | ○ |
| tackiness test | | ○ | ○ | x | ○ | ○ | x | ○ | x | ○ |
| molding processability | | ○ | ○ | ○ | ○ | ○ | ○ | ○ | ○ | x |

Discussion of the results of the evaluations in the examples and comparative examples (1) Examples 1 to 18

The results of the evaluations for Examples 1 to 18 (Table 2) demonstrate that, when a fatty acid ester is used as component (D), this has the effect of improving the combustibility (flame retardancy), stain resistance, water repellency, and marring resistance relative to polypropylene alone.

(2) Comparative Examples 1 to 9

The results of the evaluations for Comparative Examples 1 to 9 (Table 3) demonstrate that in Comparative Example 3 in particular, which used erucamide, an improvement is obtained in the combustibility (flame retardancy), stain resistance, marring resistance, and water repellency, but discoloration is produced during molding. This can be regarded as a discoloration of the erucamide and flame retardant due to the occurrence of an oxidation reaction between the amide group in the erucamide and the halogen in the flame retardant. In contrast to this, fatty acid esters, which are resistant to oxidation reactions, were shown to be free of the occurrence of discoloration during molding and to have the effect of improving the combustibility (flame retardancy), stain resistance, marring resistance, and water repellency.

INDUSTRIAL APPLICABILITY

In its use as a toilet component, the thermoplastic resin composition of the present invention is free of discoloration defects, exhibits a suppression of the staining and deterioration caused by urine, fecal matter, detergents, and so forth, exhibits an excellent tactile sensation, and also exhibits an excellent marring resistance. In addition, because, in comparison to conventional products, thermoplastic resin moldings obtained from the thermoplastic resin composition of the present invention have a better surface appearance and support a reduction in the defect rate due to the generation of scorching defects during molding and have a satisfactory flame retardancy on their own, they are well adapted for use in applications such as components in household electrical appliances such as rice cookers, vacuum cleaners, washing machines, refrigerators, fans, air conditioners, and so forth, and components for household goods such as vanities and dressers, ventilation fans, toilet seats, toilet lids, and housings for devices used as attachments or accessories.

The invention claimed is:

1. A thermoplastic resin composition, consisting of:
(A) a thermoplastic resin, per 100 weight parts thereof;
(B) 2 to 40 weight parts of an organic flame retardant;
0.1 to 2 weight parts of a component (D);
optionally (C) a flame retardant synergist; and
optionally (E) other additives,
wherein
the component (D) is at least one compound selected from the group consisting of a polyolefin-based wax, an alcohol, a carboxylic acid, and an ester, and the component (D) has a melting point of not more than 100° C. and an HLB value of not more than 5,
wherein
the carboxylic acid is at least one selected from the group consisting of unsaturated carboxylic acids, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, monomethyl maleate, monoethyl maleate, diethyl maleate, monomethyl fumarate, glycidyl acrylate and glycidyl methacrylate, and
the ester is at least one selected from the group consisting of are mono- and diesters of glycerol with fatty acids, mono-, di and triesters of sorbitan with fatty acids, and pentaerythritol esters of fatty acids, and
the other additives (E) are at least one selected from the group consisting of nucleating agents, molecular weight modifiers, foaming agents, pigments, dispersing agents, ultraviolet absorbers, antioxidants, static inhibitors, neutralizing agents, metal deactivators, stabilizers, antimicrobials, inorganic fillers and rubbery components.

2. The thermoplastic resin composition according to claim 1, wherein
the organic flame retardant (B) is a halogen-type flame retardant, and the thermoplastic resin composition comprises (C) 0.1 to 20 weight parts of the flame retardant synergist per 100 weight parts of the thermoplastic resin (A).

3. The thermoplastic resin composition according to claim 1, wherein the organic flame retardant (B) is a brominated flame retardant.

4. The thermoplastic resin composition according to claim 2, wherein the flame retardant synergist (C) is an antimony compound.

5. The thermoplastic resin composition according to claim 1, wherein the thermoplastic resin (A) is a polypropylene-based resin.

6. The thermoplastic resin composition according to claim 5, wherein the polypropylene-based resin is a propylene-α-olefin block copolymer or propylene-α-olefin random copolymer that has a melt flow rate of 1.0 to 150 g/10 minutes at a temperature of 230° C. and a load of 2.16 kg and a non-propylene α-olefin content of 1 to 30 weight %.

7. The thermoplastic resin composition according to claim 1, wherein the component (D) is a fatty acid ester that has a molecular weight of 350 to 2,000.

8. An injection-moldable thermoplastic resin composition, comprising: the thermoplastic resin composition according to claim 1.

9. A toilet component obtained by a process comprising: molding the injection-moldable thermoplastic resin composition according to claim 8.

10. The thermoplastic resin composition according to claim 2, wherein the organic flame retardant (B) is a brominated flame retardant.

11. The thermoplastic resin composition according to claim 1, consisting of the (A) a thermoplastic resin, the organic flame retardant (B), the component (D), the flame retardant synergist (C), and the other additives (E).

12. The thermoplastic resin composition according to claim 1, consisting of the (A) a thermoplastic resin, the organic flame retardant (B), and the component (D).

13. The thermoplastic resin composition according to claim 1, consisting of the (A) a thermoplastic resin, the organic flame retardant (B), the component (D), and the flame retardant synergist (C).

* * * * *